United States Patent [19]

Vandervoort

[11] 4,269,077
[45] May 26, 1981

[54] CHANGE GEAR TRANSMISSION

[75] Inventor: John R. Vandervoort, Richland, Mich.

[73] Assignee: Eaton Corporation, Cleveland, Ohio

[21] Appl. No.: 956,468

[22] Filed: Oct. 30, 1978

[51] Int. Cl.$^3$ .............................................. F16H 3/08
[52] U.S. Cl. ...................................... 74/331; 74/359
[58] Field of Search ................. 74/745, 410, 331, 357, 74/359, 360

[56] References Cited

U.S. PATENT DOCUMENTS

| | | | |
|---|---|---|---|
| 3,500,695 | 3/1970 | Keiser | 74/359 X |
| 3,611,823 | 10/1971 | Richards et al. | 74/331 |
| 4,152,949 | 5/1979 | Vandervoort et al. | 74/331 |

*Primary Examiner*—Leslie Braun
*Assistant Examiner*—Frank McKenzie
*Attorney, Agent, or Firm*—R. J. McCloskey; H. D. Gordon

[57] ABSTRACT

An improved simple change gear transmission having an extended range and/or number of gear ratios and minimized center distance and/or axial countershaft portion length is provided. The improved transmission utilizes a single main shaft which is pivotally mounted at one end and guided for free floating movement at the other end and at least two substantially identical countershafts which are compounded. Each countershaft has a plurality of ratio gears mounted therein which are grouped with identical ratio gears on the other countershafts. A plurality of mainshaft gears are disposed generally concentric of the mainshaft, but radially movable relative thereto and are in constant meshing engagement with and supported by the countershaft gears. Preferably, the mainshaft is floatably retained at the end thereof closest the input of the transmission while the other end thereof is mounted in a pivotal manner. The improvement comprises mounting the mainshaft gear closest the pivot point of the mainshaft, preferably the reverse mainshaft gear, radially and axially fixed relative to the mainshaft for rotative motion relative thereto, as by an anti-friction means such as a bushing or a bearing, and utilizing an idler gear assembly which is concentric with but freely floating relative to the mainshaft.

7 Claims, 3 Drawing Figures

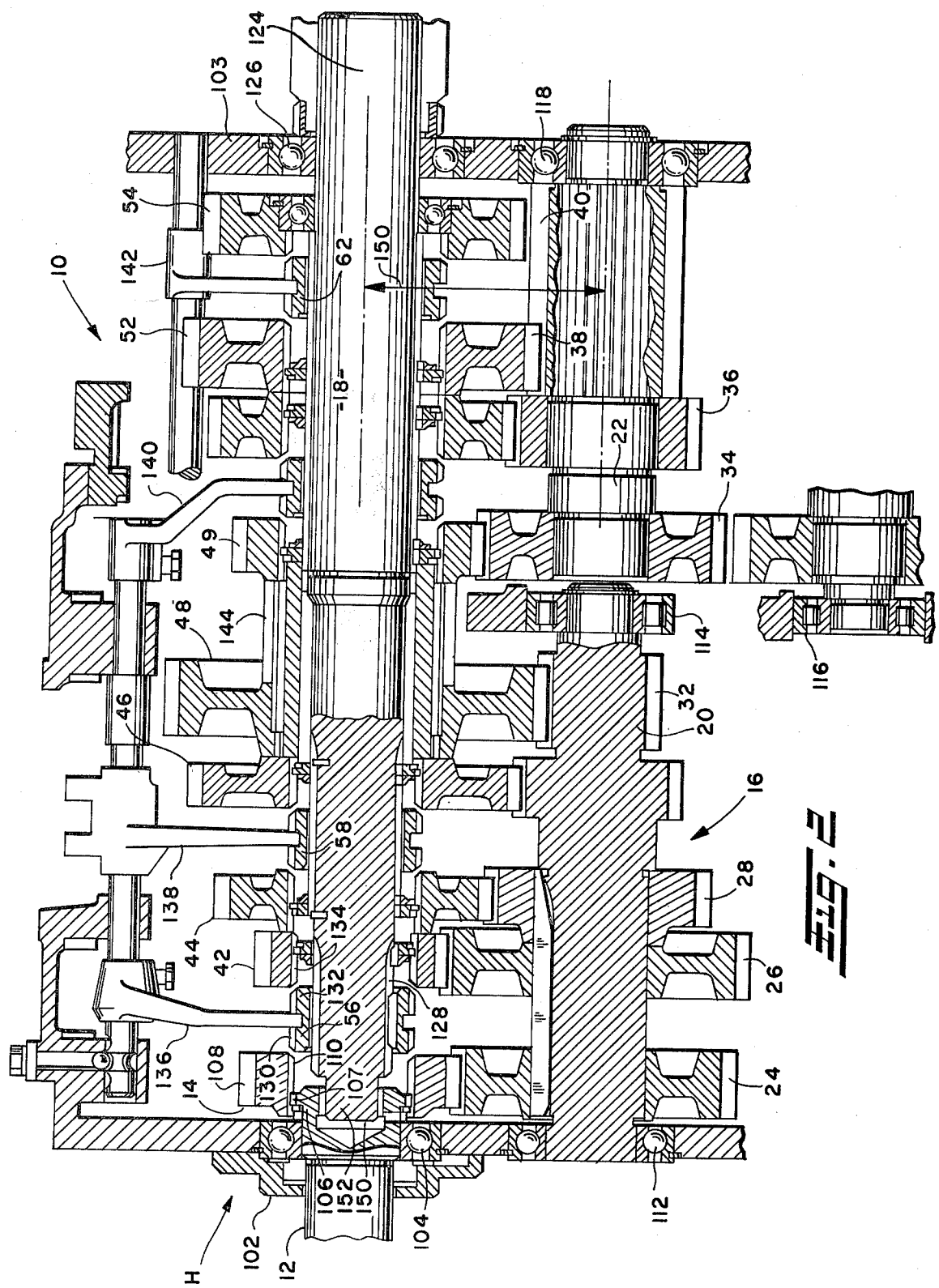

CHANGE GEAR TRANSMISSION

BACKGROUND OF THE INVENTION

Field of the Invention

The present invention relates to simple transmissions utilizing compound countershafts and, in particular, relates to simple transmissions of the type utilizing a multiplicity of substantially identical compound countershafts and a rotatable mainshaft which is arranged substantially parallel to the countershafts with means provided for pivotally supporting the output end of the mainshaft and means provided for guiding the input end of the mainshaft in free floating relation relative to the axis of the countershafts and wherein the mainshaft gear closest the pivot point of the mainshaft is radially and axially fixed relative to the mainshaft while all or substantially all of the remaining mainshaft gears are located generally concentric of the mainshaft and in constant meshing engagement with and supported solely by the countershaft gears and wherein the countershafts are each comprised of portions which are in constant meshing engagement through an idler gear assembly which is concentric with but freely floating relative to the mainshaft.

Simple transmissions, that is, transmissions utilizing a one piece mainshaft, are well known in the prior art. Transmissions utilizing either simple or compound mainshafts in connection with multiple countershafts wherein either the mainshaft gears or the countershaft gears are mounted in a radially floating manner relative to the other gears are well known in the prior art. Examples of such transmissions may be seen by reference to U.S. Pat. Nos. 3,105,395; 3,255,644; 3,283,613; 3,335,616; 3,349,635; 3,378,214; 3,500,695; and 3,648,546.

The prior art transmissions, particularly those transmissions utilizing a floating mainshaft and/or floating mainshaft gears in connection with multiple countershafts, have proven to be highly acceptable. However, to achieve a sufficiently large range of available gear ratios, it has generally been necessary to utilize a compound transmission. Such transmissions generally comprise a main transmission and an auxiliary transmission of either the "range" type or the "splitter" type or a combination thereof as is well known in the prior art. Such transmissions are highly effective and commercially successful, especially for use in heavy duty vehicles wherein a large range of ratios is required and a large number of individual gear ratios is required. Such heavy duty compound transmissions typically have 9, 10, 12, 13 or more forward gear ratios.

There has, however, developed a need for transmissions having a greater range of ratios and a greater number of ratios than is normally available in a simple transmission as the centerline distances required in prior art simple transmissions to provide same would become too great while not justifying the somewhat expensive structure and controls required for a compound transmission. The prior art devices have been unable to satisfactorily fill this need.

Simple transmissions utilizing multiple compound countershafts have been proposed wherein all mainshaft gearing was floating relative to the mainshaft and wherein the idler gear assembly was substantially rigidly mounted to the mainshaft to prevent the countershaft portions most distant the input gear from counter rotating at rest conditions which would tend to cause the mainshaft gears to sag or bottom out on the mainshaft which in turn would result in misalignment of the clutches and subsequent shifting difficulties. This was not a totally satisfactory design as the idler assembly defined a substantially rigid coupling between the front and rear portions of the countershafts and tended to transmit timing or indexing errors from the front countershaft portions to the rear countershaft portions.

SUMMARY OF THE INVENTION

In accordance with the present invention, a simple transmission which minimizes center distances, i.e., the distance between the mainshaft and the countershaft axis, minimizes the axial length of the countershaft portions and/or provides a greater range and/or number of available gear ratios than has heretofor been available is provided. The transmission preferably utilizes a mainshaft which is pivotably guided at the output end and floatingly guided at the input end in connection with substantially identical multiple countershafts, each of said countershafts being compounded to provide an extended range of ratios with a minimal center distance and a minimum axial length of countershaft portion. The countershafts are compounded by the use of a countershaft idler assembly concentric with the axis of the mainshaft and radially movable relative thereto. The mainshaft gear closest the pivot point of the mainshaft is axially and radially fixed relative to the mainshaft, as by a bearing or the like, while all or substantially all of the remaining mainshaft gears are concentric with but radially movable relative to the mainshaft.

Accordingly, it is an object of the present invention to provide an improved simple transmission having an extended range and number of available gear ratios with a minimal centerline distance and/or axial length of countershaft portions.

Another object of the present invention is to provide a simple transmission utilizing at least two substantially identical compound countershafts.

A further object of the present invention is to provide an improved floating mainshaft, multiple countershaft transmission wherein each of the countershafts is compounded to provide an extended range and/or number of available gear ratios within a predetermined centerline and wherein the transfer of timing errors from the front countershaft portions to the rear countershaft portions is reduced or eliminated.

These and other objects and advantages of the present invention will become apparent from a reading of the detailed description of the preferred embodiment taken in connection with the attached drawings.

BRIEF DESCRIPTION OF THE DRAWINGS

FIG. 2 is a sectional view of the transmission schematically illustrated in FIG. 1.

DESCRIPTION OF THE PREFERRED EMBODIMENT

Figure 1:
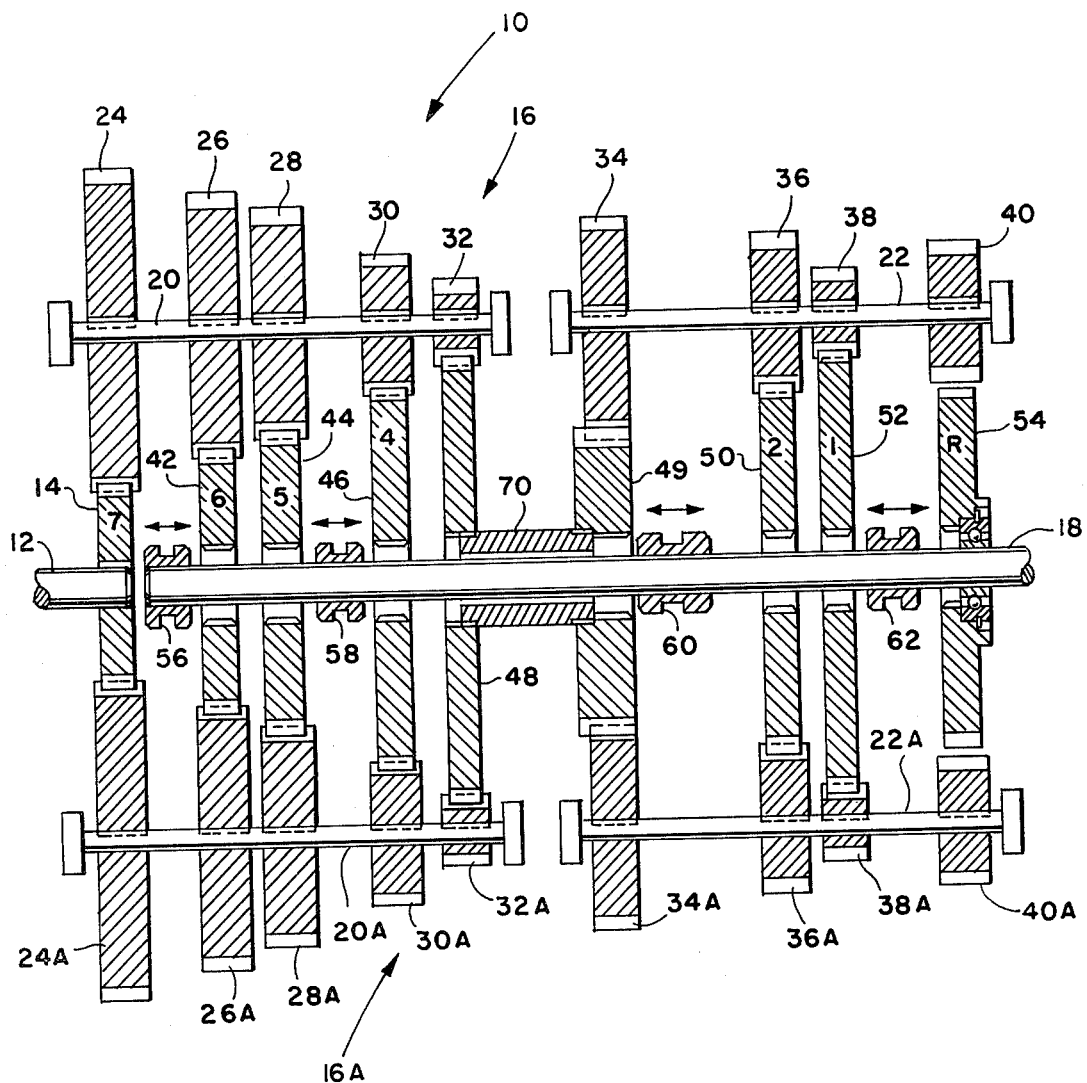
FIG. 1 is a schematic illustration of the preferred embodiment of the present invention.

In this disclosure, certain terminology will be used for convenience in reference only and will not be limiting. For example, the terms "forward" and "rearward" will refer to directions forward and rearward of the vehicle in which the transmission is installed. The terms "rightward" and "leftward" will refer to directions as taken in the drawings in connection with which the terminology is used. The terms "inward" and "outward" will refer to directions toward and away from, respectively, the geometric center of the apparatus. All foregoing terms mentioned include the normal derivatives and equivalents of each thereof.

For convenience of identification, the shaft 12 has throughout been called the input shaft, and the shaft 18 has been called the main shaft and output. This terminology has, however, been used for convenience in reference and is to be given no limiting significance inasmuch as the apparatus will operate with the direction of power flow reversed.

A schematic illustration of the preferred embodiment of the transmission of the present invention may be seen by reference to FIG. 1. The transmission 10 schematically illustrated is of the twin countershaft type, it being understood, however, that multiple countershaft transmissions utilizing any number of substantially identical countershafts may utilize the features of the present invention. The transmission 10 comprises an input shaft 12 designed to be driven by the prime mover of the vehicle and carrying a drive gear 14 thereon. A pair of compound countershafts 16 and 16A and a "floating" mainshaft 18 are provided. It is understood that the term "floating" includes shafts having one end pivotally mounted and the other end floatingly guided as well as shafts wherein both ends are floatingly guided. The axes of the mainshaft 18 and the compound countershafts, 16 and 16A, are substantially parallel. The axis of input shaft 12 is substantially concentric with the axis of mainshaft 18. The compound countershafts, 16 and 16A, are substantially identical. Each of the compound countershafts, 16 and 16A, comprises a forward portion 20 and 20A and a rearward portion 22 and 22A, respectively. Forward countershaft portions, 20 and 20A, are separately rotatable and may be substantially coaxial with the rearward countershaft portions 22 and 22A respectively. The forward portions 20 and 20A of the compound countershafts, 16 and 16A, carry gears 24, 26, 28, 30, 32 and 24A, 26A, 28A, 30A, and 32A, respectively. The rearward portions 22 and 22A of the compound countershafts 16 and 16A, carry gears 34, 36, 38, 40 and 34A, 36A, 38A, 40A, respectively.

Gears 42, 44, 46, 48, 49, 50, 52 and 54 encircle the mainshaft 18 and are constantly engaged with and supported by the countershaft gears 26, 26A, 28, 28A, 30, 30A, 32, 32A, 34, 34A, 36, 36A, 38, 38A, 40, 40A, respectively, as is well known in the art. Gear 54 is radially fixed to the mainshaft 18 by means of an antifriction bearing 72. Axially slidable clutches 56, 58, 60 and 62 are splined to the mainshaft for rotation therewith in a known manner. Clutch 56 may be selectively engaged to rotationally fix either the input shaft 12 or the gear 42 to the mainshaft. Clutch 58 may be selectively engaged to fix gear 44 or gear 46 to the mainshaft. Clutch 60 may be selectively engaged to fix gear 49 or gear 50 to the mainshaft. Clutch 62 may be utilized to fix gear 52 or gear 54 to the mainshaft.

The operation and structural features of the "floating" mainshaft, "floating" mainshaft gear, multiple countershaft type of transmission described above is well known in the prior art and a more detailed description thereof may be seen by reference to U.S. Pat. Nos. 3,105,395; 3,237,472; 3,335,616; and/or 3,500,695, all of which are assigned to the assignee of this invention and all of which are hereby incorporated by reference. In the preferred embodiment, mainshaft 18 is pivotally mounted at the rear or output end thereof and floatingly guided at the front or input end thereof, as may be appreciated in greater detail by reference to above-mentioned U.S. Pat. No. 3,500,695.

In operation, the input shaft 12 drives a gear 14 which is constantly engaged with gears 24 and 24A to drive the compound countershafts 16 and 16A and the countershaft gears mounted thereon. The countershaft gears are constantly engaged with the gears encircling the mainshaft and thus mainshaft gears 42, 44, 46, 49, 50, 52 and 54 and mainshaft idler gear 48 are constantly rotating whenever the input shaft is rotating. The operator of the vehicle may, for example, simply move sliding clutch 62 to the right to rotationally couple gear 54 to the mainshaft to achieve a reverse rotation. Similarly, sliding clutch 62 may be moved to the left to couple gear 52 to the mainshaft 18 for operation in the fast forward speed. Similarly, sliding clutch 60 may be utilized to engage gear 50 with the mainshaft for second speed or gear 49 with the mainshaft for third speed. In a similar manner clutch 58 may be utilized to engage gear 46 with the mainshaft for fourth speed or gear 44 with the mainshaft for fifth speed. Clutch 56 may be utilized to engage gear 42 with the mainshaft for sixth speed or to engage the input shaft 12 directly with the mainshaft 18 for seventh speed operation.

Figure 3:
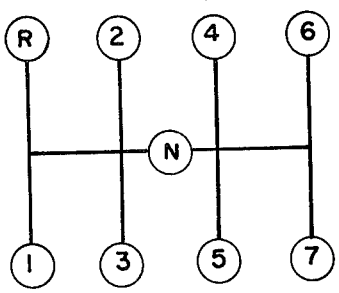
FIG. 3 is a schematic illustration of the shift pattern for the transmission of the present invention.

Reference to FIG. 3 will illustrate the shift pattern followed by the operator.

Countershaft gears 32 and 32A meshingly engage and drive mainshaft idler gear 48 as may be seen. The mainshaft gear 49 also surrounds mainshaft 18 and is splined or coupled to idler gear 48 for rotation therewith. The gear 49 drivingly engages countershaft gears 34 and 34A which are rotationally fixed to rearward countershaft portions 22 and 22A, respectively, to drive the rearward portions 22 and 22A of the countershafts. Mainshaft idler gear 48 has an axis of rotation generally concentric with the axis of rotation of the mainshaft 18. Idler gear 48 is coupled to mainshaft gear 49 by means of a coupling 70 which surrounds mainshaft 18 and is free to move radially relative thereto. Coupling 70 may be mounted to gears 48 and 49 by a splined connection or the like. Preferably, the spline connection is crowned and/or of greater than normal backlash allowing gears 48 and 49 to rotate on different axes of rotation.

FIG. 2 illustrates the structural embodiment of the transmission 10 schematically illustrated in FIG. 1. Elements of the transmission structure illustrated in FIG. 2 corresponding to those elements schematically illustrated in FIG. 1 will be assigned like numerals.

The multicountershaft transmission 10 includes a horizontally split housing H, only a portion of which is shown. The housing H has a forward end wall 102 and a rearward end wall 103. Each of said endwalls is provided with openings for receipt of the various shaft bearings. The input shaft 12 is supported by bearing 104 and carries an enlarged splined head 106 on the rearward end thereof. The head 106 carries splines 107 which support the annular drive gear 14. The drive gear 14 has external teeth 108 and internal clutch teeth 110. The input shaft 12 is also provided with a recess 150 having a rearwardly facing opening in which the front or input end 152 of the mainshaft 18 is loosely received allowing the mainshaft to float freely relative to the input shaft.

The transmission 10 includes two substantially identical or twin compound countershafts 16 and 16A, only one of which, 16, is illustrated in FIG. 2. Countershaft 16 comprises a forward portion 20 and a rearward portion 22. Forward portion 20 of compound countershaft 16 is supported by bearings 112 and 114. Rearward portion 22 of countershaft 20 is supported by bearings 116 and 118. The forward portion 20 of countershaft 16 carries thereon and fixed for rotation therewith countershaft gears 24, 26, 28, 30, and 32. The rearward portion 22 of countershaft 16 carries thereon and fixed for rotation therewith countershaft gears 34, 36, 38, and 40. Countershaft gear 24 is in constant mesh with the input or drive gear 14.

The mainshaft 18 comprises the output unit of transmission 10. The mainshaft is arranged substantially coaxially with the input shaft 12 and is mounted for a degree of radial movement or floating movement relative to the countershafts 16 and 16A. In the embodiment illustrated, the forward end 152 of the mainshaft 18 is loosely received in an annular recess 150 at the rearward end of input shaft 12. The rearward end 124 of mainshaft 18 is pivotally supported by a bearing 126. Further details as to the mounting of the mainshaft may be seen by reference to U.S. Pat. No. 3,500,695.

Mainshaft gears 42, 44, 46, 49, 50 and 52 and mainshaft idler gear 50 encircle the mainshaft 18 for constant engagement with and are supported solely by the countershaft gears as is well known in the prior art. Clutch units 56, 58, 60 and 62 are utilized to selectively clutch one of the mainshaft gears to the mainshaft. Mainshaft gear 54, the reverse drive gear, is radially fixed on the mainshaft by bearing 72.

By way of example, mainshaft clutch unit 56 is slidingly mounted on the forward end of the mainshaft 18 on splines 128 and carries clutch teeth 130 which are engageable with the clutch teeth 110 on the input drive gear 14 upon leftward movement of said clutch unit 56. Clutch unit 56 also carries clutch teeth 132 which are engageable with suitable internal clutch teeth 134 in the mainshaft gear 42 upon rightward movement of the clutch unit 56. The remainder of the mainshaft clutch units, 58, 50, and 62, operate in a similar manner and will not be described in further detail. Shift forks 136, 138, 140, and 142 are utilized to selectively move mainshaft clutch units 56, 58, 60 and 62, respectively, either to the right or to the left as is well known in the art.

Each of the gears 42, 44, 46, 49, 50, 52 and 54 may be collectively termed "mainshaft gears" since they are all capable of drivingly engaging the mainshaft. However, it is emphasized that gears 42, 44, 46, 50 and 52 are all supported on and by the countershaft gears and that they merely surround and at times engage the mainshaft but are not supported on or by the mainshaft. Rather, the mainshaft will move both rotatably and about the pivot axis with respect to those of the mainshaft gears with which it is not clutched at a particular moment. Mainshaft idler gear 48 is supported in a similar manner.

Synchronizers and/or blocking rings can, if desired, be provided between the interengageable teeth associated with the various clutch units and the internal clutch teeth associated with the various mainshaft gears.

Surrounding the mainshaft but not supported thereby is a coupling member 70. Coupling member 70 is rotationally coupled to mainshaft idler gear 48. It is noted that coupling member 70 is also affixed for rotation with mainshaft gear 49, and thus gear 49 is driven by countershaft gear 32 on the forward countershaft portion 20 of countershaft 16. Mainshaft gear 49 is in constant engagement with countershaft gear 34 on the rear countershaft portion 22 of countershaft 16 and thus a substantial gear reduction between the forward countershaft portion 20 and the rearward countershaft portion 22 of countershaft 16 is achieved without the necessity of increasing the center distance 150 which is the distance between the centerline of the countershaft 16 and the mainshaft 18. A spacer, 144, may be utilized between gears 48 and 49.

It is noted that countershaft gear 40 and mainshaft gear 54 are not in direct meshing engagement but rathr each mesh with a reverse idler (not shown) as is well known in the art. Although gears 40 and 54 mesh through an idler, they are considered to be constantly meshed as each is in constant meshing engagement with the idler.

Mainshaft gear 54, the reverse drive mainshaft gear, is mounted on the mainshaft 18 by means of an antifriction bearing, such as ball bearing 72, and thus is radially fixed thereto. As the mainshaft will pivot at its rearward end 124 generally about the bearing 126, mainshaft gear 54 is the mainshaft gear closest the pivot point of the mainshaft 18.

Applicant has found that by mounting the mainshaft gear closest the pivot point of the mainshaft radially fixed to the mainshaft, a floating coupling between the front and the rear portions of the compound countershafts may be utilized to isolate timing errors between the countershaft portions while preventing sagging of the mainshaft gears supported by the rear countershaft portion countershaft gears as a result of counter-rotation of the rear countershaft portions and still retaining most of the features of the floating mainshaft, floating mainshaft gear transmission. Counter rotation of the front countershaft portions, 20 and 20A, is, of course, prevented by the engagement of countershaft gears 24 and 24A with fixed input gear 14.

Although this invention has been described in its preferred form with a certain degree of particularity, it is understood that the present disclosure of the preferred form has been made only by way of example and that numerous changes in the details of construction and combination and arrangement of parts may be resorted to without departing from the spirit and the scope of the invention as hereinafter claimed.

I claim:

1. An improved simple change gear transmission of the type comprising:
   an input shaft having an input gear thereon; a mainshaft, said mainshaft guided for floating movement at the end thereof closest the input shaft and mounted for pivotal movment at the other end thereof; at least two substantially identical compound countershafts each having an axis of rotation substantially parallel with the axis of rotation of said mainshaft, each countershaft having a plurality of countershaft gears mounted thereon which are grouped with identical countershaft gears on the other countershaft, said coutershafts each having a first portion carrying a countershaft gear in engagement with said input
   gear and a second portion; a countershaft gear on each of said first portions and a countershaft gear on each of said second portions in constant engagement with an idler means to establish a driving relation between said first and second portions, rotation of said input gear causing said first portions to have greater angular velocity than said second portions; a plurality of floating mainshaft gears surrounding said mainshaft and constantly meshed with and supported by a group of said countershaft gears; and clutch means for selectively clutching said floating mainshaft gears one at a time to said mainshaft, the improvement comprising:

said idler means comprising an idler gear surrounding said mainshaft and constantly meshed with and supported by a group of countershaft gears on one of said first and second portions of said countershafts, and idler gear coupled by a coupling means for rotation with a floating mainshaft gear constantly meshed with a group of countershaft gears on the other of said first and second portions of said countershaft, said coupling means surrounding and radially movable relative to said mainshaft, the mainshaft gear closest the pivot point of the mainshaft being constantly meshed with a group of countershaft gears, selectively clutchable to the mainshaft and supported on the mainshaft by means of an antifriction bearing for radial movement therewith and rotational movement relative thereto.

2. The improved transmission of claim 1 wherein said antifriction bearing is a roller bearing.

3. The improved transmission of claims 1 or 2 wherein said mainshaft gear radially fixed to the mainshaft is the reverse drive gear.

4. The improved transmission of claim 3 wherein said coupling means comprises a generally tubular sleeve having external splined teeth on at least one axial end thereof.

5. The improved transmission of claim 3 wherein said transmission comprises only two compound countershafts.

6. The improved transmission of claim 4 wherein the external splined teeth on said coupling means engage internal splined teeth on said idler gear to define a splined connection, the backlash between said internal and external spline teeth being greater than normal.

7. The improved transmission of claim 4 wherein said spline teeth are crowned.

* * * * *